United States Patent [19]
Mierendorf

[11] 3,883,759

[45] May 13, 1975

[54] ELECTRIC TACHOMETER AND MOUNTING MEANS THEREFOR

[75] Inventor: Robert E. Mierendorf, Greendale, Wis.

[73] Assignee: Harnischfeger Corporation, West Milwaukee, Wis.

[22] Filed: Sept. 4, 1973

[21] Appl. No.: 394,058

[52] U.S. Cl. ................ 310/91; 310/112; 310/113; 318/618
[51] Int. Cl. ............................................. H02k 5/26
[58] Field of Search ......... 310/91, 66, 67, 112, 113; 318/618

[56] References Cited
UNITED STATES PATENTS

| | | | |
|---|---|---|---|
| 1,797,531 | 3/1931 | Sandleson | 310/91 UX |
| 1,868,533 | 7/1932 | Johnson | 310/91 |
| 2,198,863 | 4/1940 | Corey et al. | 310/91 |
| 3,043,970 | 7/1962 | Hatten et al. | 310/91 |
| 3,395,594 | 8/1968 | Blair | 310/91 X |

*Primary Examiner*—T. E. Lynch
*Attorney, Agent, or Firm*—James E. Nilles

[57] ABSTRACT

An electric tachometer for external connection to an electric motor having a shaft or driving a shaft which is subject to "end float" and eccentric rotation comprises a stator in which a rotor is mounted. The tachometer rotor is connected directly to the shaft and the shaft affords mechanical support for the tachometer which is axially and eccentrically movable with the shaft. Mounting means of various types are provided to prevent rotational movement of the tachometer stator while allowing for axial and eccentric movement of the tachometer.

8 Claims, 11 Drawing Figures

PATENTED MAY 13 1975 3,883,759

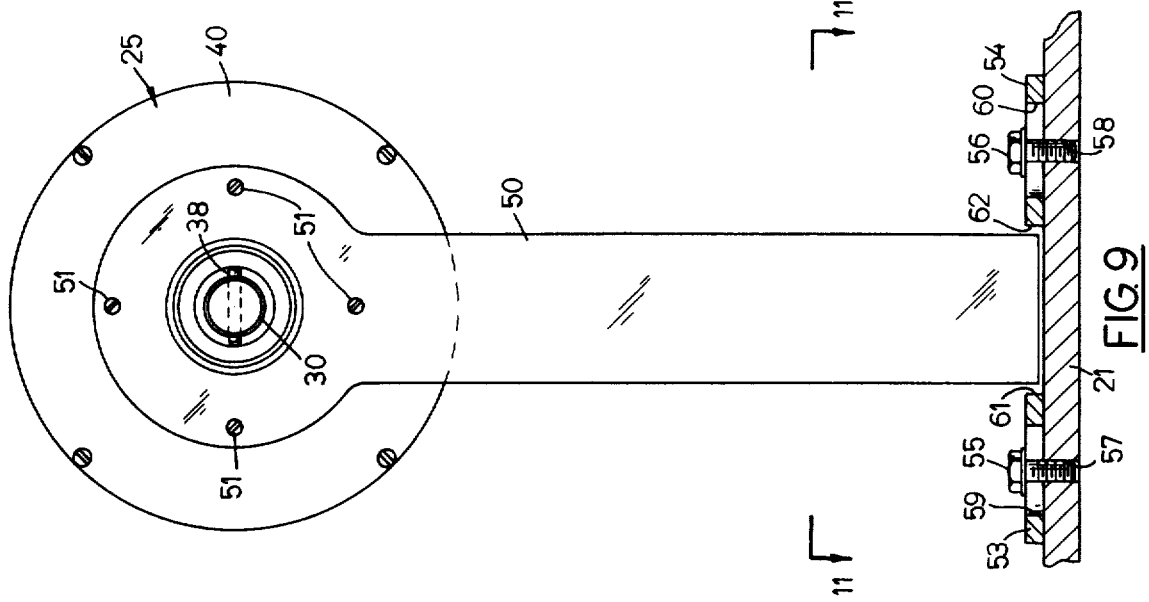
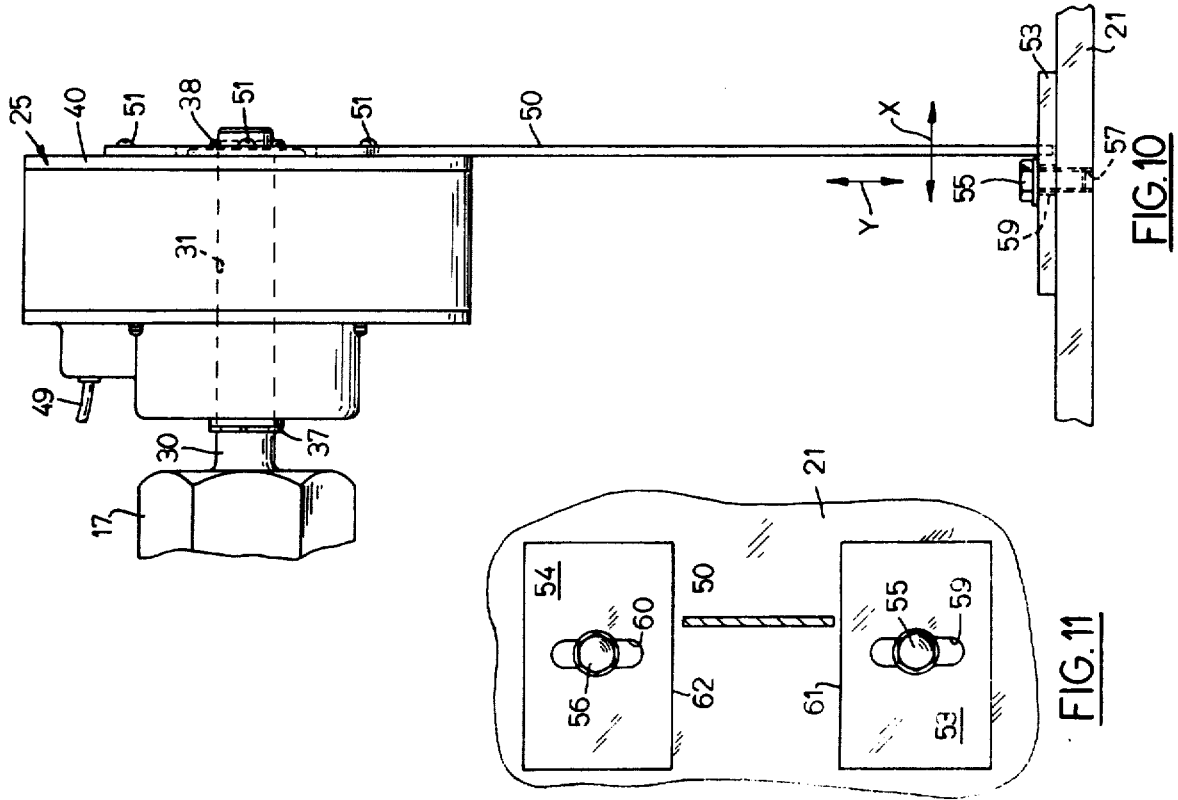

ELECTRIC TACHOMETER AND MOUNTING MEANS THEREFOR

BACKGROUND OF THE INVENTION

1. Field of Use

This invention relates generally to electric tachometers which are coupled directly to the end of a shaft, such as the shaft of an electric motor, and, particularly to mounting means therefor.

2. Description of the Prior Art

In some industrial equipment powered by an electric motor, it is necessary to employ an electric tachometer mechanically connected to and driven by the motor shaft and to use the electrical output signal from the tachometer to control the motor in some way. In some cases the electric tachometer is built into the motor it controls, and in other cases the electric tachometer is located externally of the motor and mechanically coupled to the motor shaft or to some other shaft driven by the motor.

For example, built-in alternating current type electric tachometers are sometimes used in alternating current motors and comprise an annular-shaped magnetically permeable stator ring press-fitted into an end bell of the motor; an annular shaped rotor (containing spaced apart permanent magnets) press-fitted onto the motor shaft and concentric with the stator; and an annular-shaped induction winding mounted in the motor end bell for providing and output signal in response to induced flux changes resulting from relative rotation between the rotor and stator. Such an arrangement requires a small air-gap between the rotor and stator, but, because of the relatively large bearing tolerances in larger motors, some undesired rubbing often results.

On the other hand, some direct current motors employ a prior art direct current type electric tachometer and, since the latter employ commutators and are relatively large, these are usually mounted in a fixed location externally of the motor and mechanically coupled to the end of the motor shaft by a suitable mechanical coupling. However, the motor shafts of direct current motors, such as are used for load hoist purposes in overhead cranes or in steel mill applications, due to large motor size and large bearing tolerances, have a considerable amount of end float (i.e., axial travel of the motor shaft) and rotational eccentricity. Consequently, since the prior art electric tachometers were stationarily mounted and relatively delicate, it was necessary to employ a high quality flexible shaft coupling to couple the tachometer shaft to the shaft of the motor being controlled. The coupling was used to take up stresses when more than two bearings locate the motor shaft, and to correct for misalignment caused by the set-up, temperature, pressure, operation and wear. Furthermore, such couplings had to be carefully designed and manufactured to insure constant velocity of the tachometer, low windup, zero backlash, parallel and angular misalignment capability, low inertia and low maintenance. However, even with such a coupling, the motor shaft was sometimes in a location where alignment of the coupling was a problem. For example, in some overhead cranes the end of the motor shaft to which the coupling was to be fitted is housed within the brake wheel for the motor. In such cases it was necessary to align the shafts of the motor and tachometer before the coupling is in place by means of straight-edges, adjust and shim the tachometer, and then remove the tachometer so that the coupling could be inserted, thereby introducing a possibility of misalignment. To overcome or reduce these difficulites, it was sometimes the practice to machine the motor shaft to closer tolerances, provide special stub shafts for the motor shaft or provide special pedestal arrangements for mounting the tachometer or use some or all of these approaches. Even then, with such an arrangement there was always the risk of the coupling breaking with a resultant loss of the feedback signal from the tachometer. To avoid this, protective circuitry was required. It is desirable, therefore, to provide improved electric tachometers and mounting means therefor.

SUMMARY OF THE INVENTION

In accordance with the present invention there is provided an electric motor which has a motor shaft or drives a shaft which is subject to movement other than rotational movement during rotation, such as end float (i.e, axial movement) or eccentric movement or both. An electric tachometer is connected to an end of the driven shaft to provide an electric signal, such as a feed back signal, related to rotational movement of the shaft and which is used to control the motor. The tachometer comprises a housing in which a stator, a rotor and bearings for the rotor are mounted. Means are provided to connect the rotor to the end of the driven shaft and to enable the driven shaft to afford mechanical support for the tachometer. In preferred embodiments of the invention such means comprise a concentric hole in the tachometer rotor and a stub shaft fictionally engaged in the hole. The stub shaft may be integral with the driven shaft or a separate member pressfitted in a hole in the face of the driven shaft or attached to or integral with a threaded nut which screws onto a threaded end of the driven shaft. Since the tachometer is supported on the driven shaft, it follows all non-rotational movements of the end of the driven shaft. Restraining means are provided to prevent rotational movement of the tachometer stator while permitting non-rotational movement of the tachometer. In a preferred embodiment of the invention the restraining means take the form of a first member which has one portion rigidly secured to the tachometer housing and which has another portion entrapped between a pair of rigid spaced apart second members which are mounted in a fixed position with respect to the driven shaft. The second members prevent rotational movement of the first member and the tachometer stator but allow for movement of the first member and the tachometer attached thereto in other directions i.e., in directions transverse and also parallel to the driven shaft axis.

The electric tachometer and mounting means therefor in accordance with the invention is especially well adapted for use with large dc motors such as are used on overhead cranes or in steel mill applications and which have a considerable amount of non-rotational shaft movement due to the large amount of play in the motor bearings. Furthermore the invention is well suited for use tachometers which provide a direct current output signal and which employ a commutator as part of the rotor assembly and a brush holder assembly within the housing and which, as a consequence, would be unduly difficult to service if they were built into the motor housing as is the case with some brushless, commutatorless alternating current type electric tachometers.

DRAWINGS

FIG. 9 is an enlarged end elevational view taken on line 9—9 of FIG. 2 and showing restraining means for the tachometer;

FIG. 10 is a side elevational view of the tachometer and restraining means shown in FIG. 9; and FIG. 11 is a top plan view taken on line 11—11 of FIG. 9.

DESCRIPTION OF A PREFERRED EMBODIMENT

Figure 2:
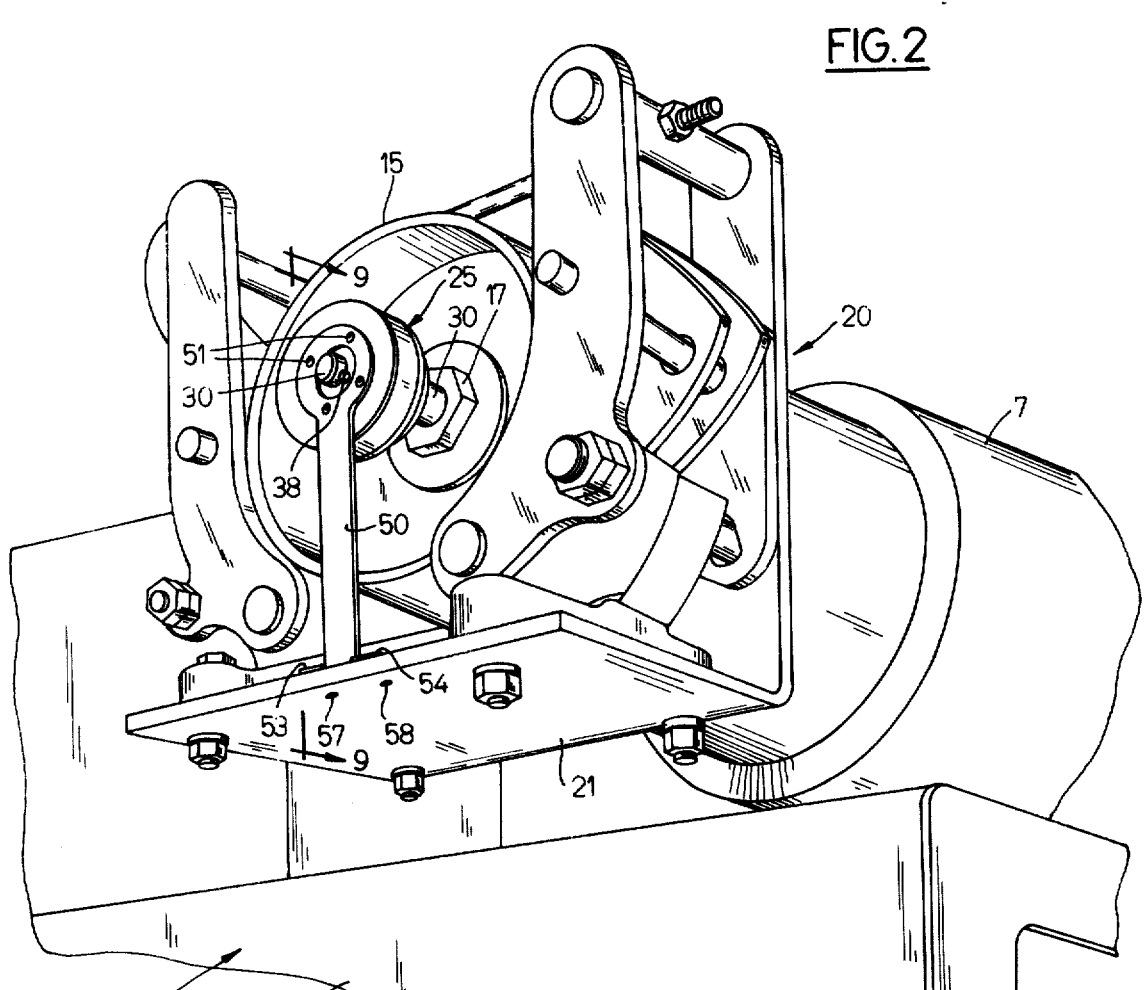
FIG. 2 is a perspective view of a portion of the motor, brake assembly, and tachometer and mounting means therefor shown in FIG. 1.
Figure 1:
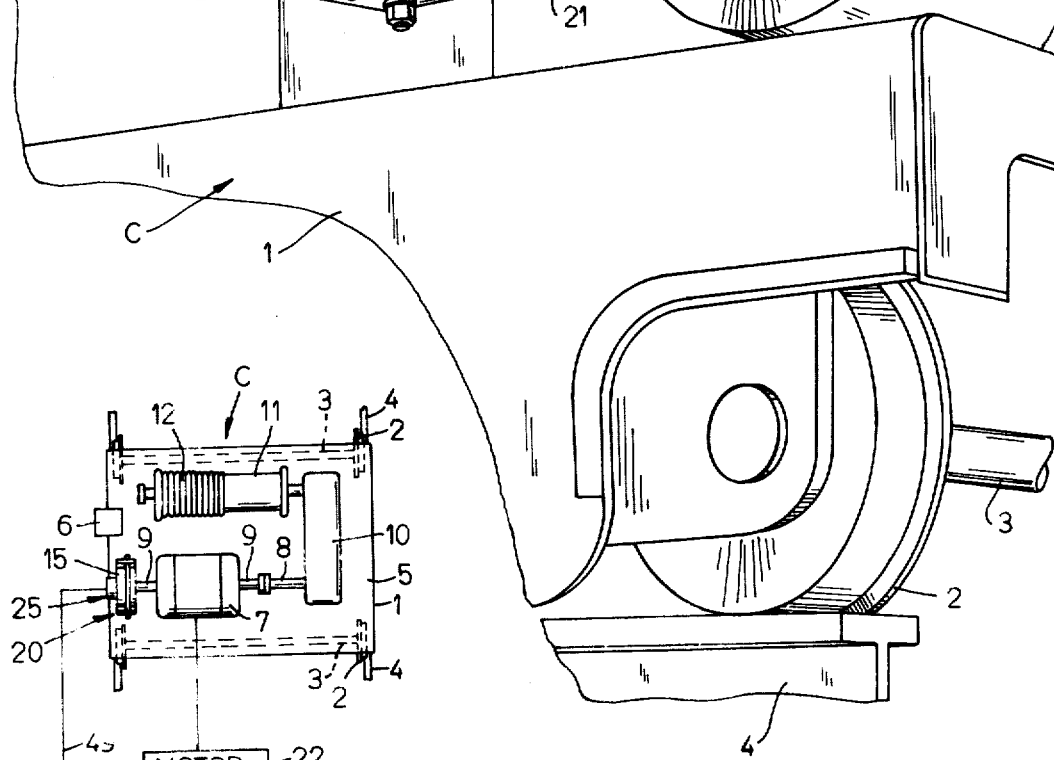
FIG. 1 is a schematic top plan view of a portion of an overhead crane having an electric motor and an electric tachometer and mounting means therefor in accordance with the present invention.
Figure 8:
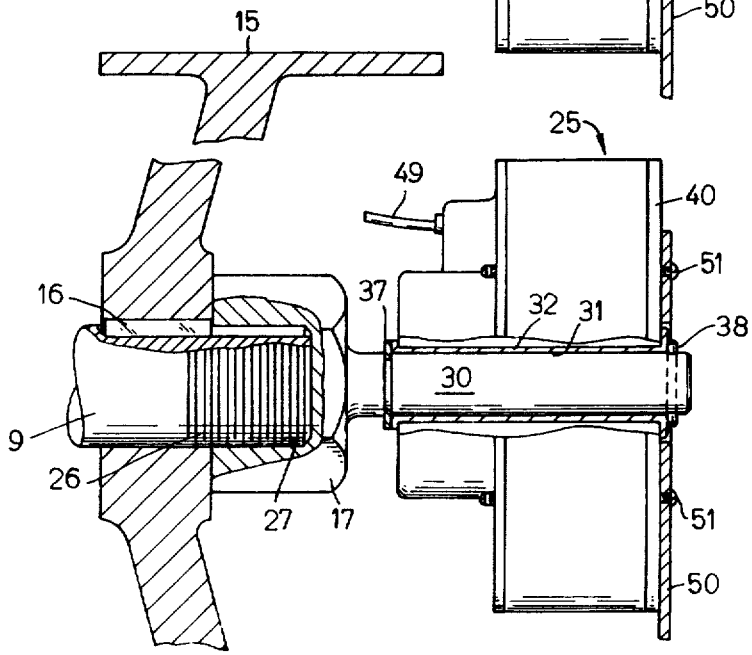
FIG. 8 is a view similar to FIG. 6 but showing still another form of connecting means.

Referring to FIGS. 1 and 2, there is shown a portion of an overhead travelling crane C which includes a frame 1 having conventional wheels 2 mounted on shafts 3 journalled on the frame which adapt it for movement in opposite directions on rails 4. Frame 1 comprises a supporting base 5 on which are mounted an electric motor 6 for driving the wheels 2 and a hoist comprising an electric motor 7, a shaft 8 connected to and driven by a shaft 9 of motor 7, an enclosed drive gear train 10 to which shaft 8 is connected, and a hoist drum 11 connected to gear train 10 and on which a load line 12 is reeved. The shaft 9 of motor 7 extends outwardly from both ends of motor 7. The outer end of motor shaft 9 is provided with a brake wheel 15 which is secured thereto by means of a key 16 and a large nut 17, as shown in FIGS. 2 and 8. Brake wheel 15 cooperates with releasably engageable brake shoes which are part of a brake 20, such as described in detail in U.S. Pat. No. 3,349,873, issued on Oct. 31, 1967 to D. C. Wycoff et al. and entitled "Self-Adjusting Power Operated Brake." Brake wheel 15 is of such a configuration that access to the outer end of motor shaft 9 is relatively difficult. Brake 20 comprises a brake base member 21 which is understood to be rigidly secured to the housing of motor 7 and affords support for the brake components. It is to be understood that motor 7 is a dc motor having a rotor which is capable of rotation in opposite directions as conditions require and is capable of being plugged. An electric motor control 22 is provided for motor 7 to operate it in either direction and to effect plugging. It is to be understood that, because of the size of motor 7 and the large tolerances therein, motor shaft 9 is subject to axial movement called end float and to eccentric rotation during motor operation.

An electric tachometer 25, hereinafter described in detail, is provided at and connected to the extreme outer end of motor shaft 9 and provides an electric output of feedback signal in response to rotation of the motor shaft to motor control 22 to effect certain control functions in connection with operation of motor 7.

Figure 6:
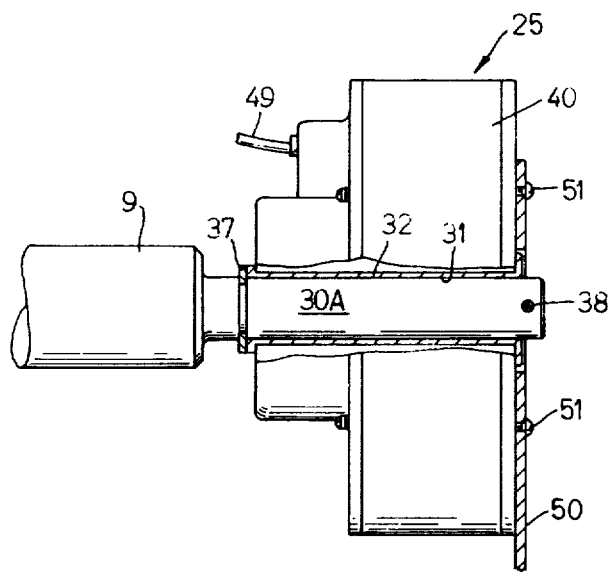
FIG. 6 is an enlarged view partly in cross-section and with portions broken away of connecting means for connecting the tachometer to a shaft.
Figure 7:
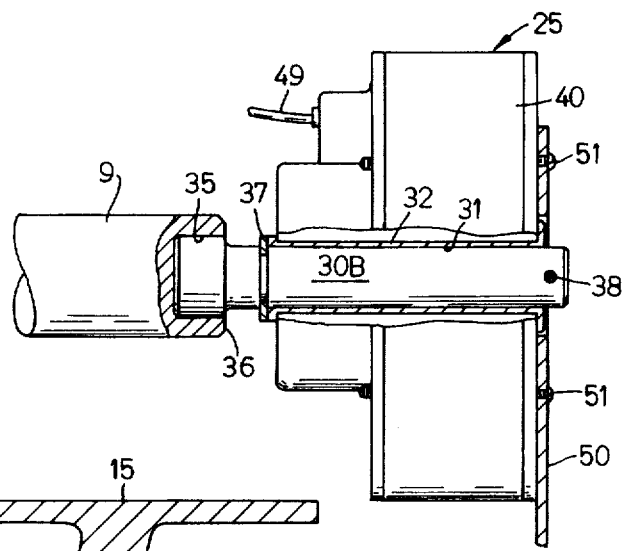
FIG. 7 is a view similar to FIG. 6 but showing another form of connecting means.

In the arrangement shown in FIGS. 1, 2, and 8, the motor shaft 9 is provided with external threads 26 near its outer end which are engageable with the internal threads 27 of the large nut 17 which is used to secure brake wheel 15 on the shaft. In accordance with the invention, nut 17 is provided with an integrally formed stub shaft 30 which extends from the center thereof and which is friction fitted in a hole 31 in the rotor 32 of tachometer 25. Tachometer 25 is maintained in position on stub shaft 30 by entrapment between a snap ring 37 engaged in a groove near the inner end of the stub shaft and a roll pin 38 in a hole located near the outer end of the stub shaft. By this means rotational movement of motor shaft 9 is transmitted directly to the tachometer rotor 32 and the entire tachometer 25 is supported by the motor shaft and movable therewith. FIGS. 6 and 7 show alternative arrangements for connecting motor shaft 9 to tachometer 25. In FIG. 6, for example, a stub shaft 30A may be integrally formed with motor shaft 9 as by machining. In FIG. 7, for example, a stub shaft 30B may take the form of a separate machined member which is press-fitted into a circular concentric hole 35 provided in the end face 36 of motor shaft 9. In the arrangement shown in FIGS. 1, 2 and 8 motor shaft 9 acting through stub shaft 30 drives the rotor 32 of tachometer 25 and physically supports the entire tachometer. However, it is to be understood that tachometer 25 could be connected and supported in the manner shown to the end of a shaft other motor shaft 9, such other shaft being driven by motor 7 and having an end which exhibits non-rotational movement during rotation.

Figure 3:
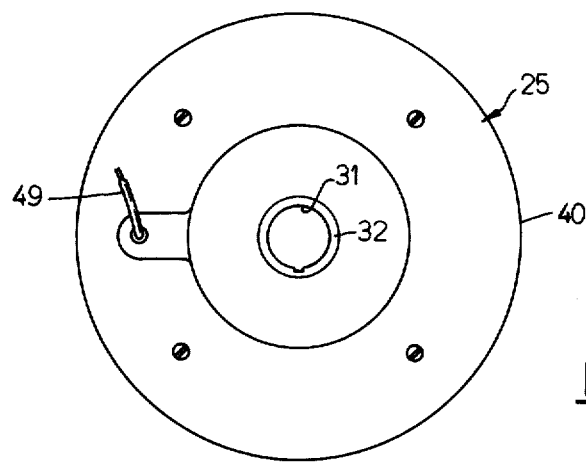
FIG. 3 is an enlarged elevational view of the front side of the tachometer shown in FIGS. 1 and 2.
Figure 4:
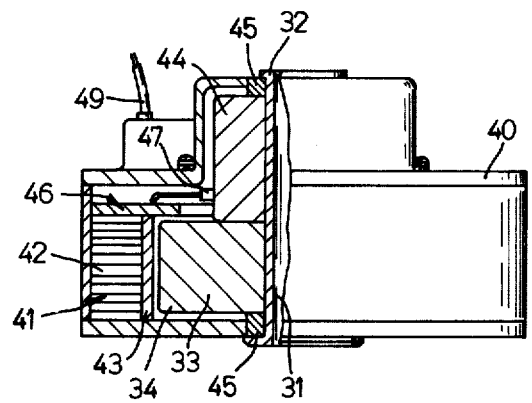
FIG. 4 is a side elevational view of the tachometer shown in FIG. 3.
Figure 5:
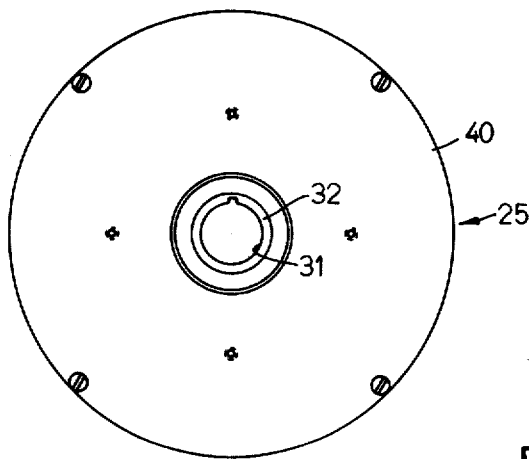
FIG. 5 is an elevational view of the rear side of the tachometer shown in FIGS. 3 and 4.

As FIGS. 3, 4 and 5 show, tachometer 25 comprises a housing 40 in which a stator 41 and rotor 32 are mounted. Stator 41 which is rigidly secured to housing 40 comprises a laminated iron ring 42 on which spaced apart permanant magnets 43 are rigidly mounted, Stator 41 also comprises a brush ring assembly 46 rigidly secured to housing 40 and having a plurality of brushes 47.

Rotor 33 comprises a hollow rotor shaft 32 which is journalled for rotation on bearings 45 which are supported in housing 40. Rotor 33 further comprises coils or windings 34 which are mounted or supported on rotor shaft 32 and which are electrically connected in a conventional manner to a commutator 44 which is also suppported on and rotatable with rotor shaft 32. The brushes 47 engage commutator 44 and are connected to electric conductors or leads 49 which lead from the tachometer housing 40 and are ultimately electrically connected to motor control 22 to transmit the signal from tachometer 25 to the motor control to effect regulation of motor 7. The rotor 33 is provided with circular central opening 31 which, for example, is on the order of .81 inches in diamter and is adapted to snugly engage with stub shaft 30 (or 30A or 30B) so that rotation of the stub shaft effects rotation of the tachometer rotor 33. Tachometer 25 is designed, for example, so that it produces 50 volts per 1,000 rpm of the rotor. This rating is typical for the signal output of dc type electric tachometers used in the field of electric motor control. As FIGS. 3, 4 and 6 make clear, the tolerances and clearances between components within tachometer 25 are relatively small and there is little, if any, relative axial or lateral movement possible between the stator 41 and the rotor 33. It is to be understood that the mounting arrangement for tachometer 25 is such that the entire tachometer is physically supported on the stub shaft 30 (and, thus, on the motor shaft 9) and is able to follow any and all movements of shaft 9, such as axial movement of the shaft in either direction and eccentric movement of the shaft about its theoretical axis of rotation.

While various types of tachometers are suitable for use in the present invention, a dc tachometer/generator identified as having a motor package MH-5010-007 with B winding and manufactured by Torque Systems, Incorporated, 225 Crescent St., Waltham, Mass., 02154 is well adapted for use in accordance with the present invention. Such a tachometer is capable of providing a continuous feedback signal of appropriate value and is of a physical size and construction which enables it to be used directly with an appropriately sized stub shaft which is insertable in a hole in its rotor.

Since the entire tachometer 25 is mounted directly on and supported by the end of a rotatable shaft, the entire tachometer would tend to rotate and be unable to produce a reliable output signal unless rotational movement of the tachometer stator 41 is restrained relative to tachometer rotor 33. In accordance with the invention, restraining means are provided which are arranged between stator 41 and some member or element which is fixed or stationary with respect to motor shaft 9 so as to prevent rotational movement of stator 41 but to permit all other non-rotational movement of the entire tachometer resulting from corresponding non-rotational movement of motor shaft 9. As FIGS. 1, 2, 9, 10 and 11 show, such a fixed or stationary member is, for example, the same mounting base or support member 21 on which the brake 20 is mounted. It is to be understood, however, that other fixed elements, members, supports, points or surfaces could be employed.

The restraining means comprise a first member 50 in the form of an elongated, downwardly depending rigid member, preferably formed of sheet metal, which has its upper portion rigidly connected to the back side of housing 40 of tachometer 25 as by a plurality of screws or bolts 51 and which has a lower portion which is trapped between a pair of space apart members 53 and 54 which are secured to member 21 by bolts 55 and 56, respectively, which extend through slots 59 and 60, respectively, and are in threaded engagement with threaded holes 57 and 58, respectively, provided in support member 21. These members 53 and 54 are spaced apart from each other in a direction which is transverse, i.e., at right angles to, the axis of rotation of motor shaft 9 and the tachometer rotor 33. The inner faces or edges 61 and 62 of the members 53 and 54, respectively, are flat and parallel to each other so as to prevent or inhibit rotational movement of the depending member 50 in either direction about the theoretical rotational axis of shaft 9. Furthermore, the surfaces 61 and 62, being parallel, permit vertical upward or downward movement of the depending member 50 in a direction shown by arrow Y in FIG. 10 which is transverse to the theoretical rotational axis of shaft 9, as well as movement of member 50 along the axis of shaft 9 as shown by arrow X in FIG. 10. The members 53 and 54 thus serve to restrain rotational movement of depending member 50 and of tachometer stator 41 but do not prevent forward or rearward axial movement or upward or downward vertical movement of these elements. Thus, tachometer 25 is able to float and follow any end float or erratic rotational movement of motor shaft 9 or such other shaft on which the tachometer is mounted.

As FIGS. 9, 10 and 11 show, each member 53, 54 is provided with an elongated slot 59, 60 for accommodating its associated bolt 55, 56. When a bolt 55, 56 is loosened, the slot 59, 60 permits the member 53, 54 to be moved or adjusted toward or away from the side edges of the depending member 50.

Tachometer 25 and the mounting and restraining means therefor in accordance with the invention offer numerous advantages over prior art arrangements. For example, the entire tachometer 25 is free to move or float with the end of motor shaft 9 or such other shaft on which it is mounted. As a consequence, no load is imposed on the tachometer bearings as a result of either end float of the shaft or erratic rotational movement of the shaft. Thus, the life of the bearings is substantially prolonged. Furthermore, there is no requirement for critical adjustment or fitting to align the axis of tachometer rotor 33 with the axis of motor shaft 9 because such alignment occurs automatically or inherently when the stub shaft 30 (or 30A or 30B) is pressed into hole 31 in tachometer rotor 33 during installation of tachometer 25. Furthermore, once tachometer 25 is installed with depending member 50 rigidly secured thereto, the placement or location of the members 53, 54 is determined by the natural position of depending member 50. However, because the members 53, 54 are adjustably movable, there is no need for advance critical location of the holes 57, 58 because the slots 59, 60 in the members 53, 54 enable the members to be shifted within a relatively large range to accommodate the actual desired position of the lower portion of depending member 50. It is apparent, therefore, that the invention disclosed is well adapted for field installation since precise measurement and alignment of the motor shaft 9, the stub shaft 30, and the tachometer rotor 32 formerly required in prior art arrangements (and best carried out under controlled machine shop conditions) is no longer necessary.

I claim:

1. In combination: an electric motor having a housing; a rotatable first shaft driven by said motor and having an axis; a plate member lying in a plane generally parallel to and spaced from said axis, said plate being in a fixed position position with respect to said motor housing; said first shaft being capable of exhibiting non-rotational movement in any direction transverse to or parallel to said plate member during rotation; motor control means for said motor; and electric tachometer comprising a stator and a rotor for measuring rotary motion of said first shaft and for providing an electric output signal related thereto to said rotor control means for effecting controlling of said motor, said stator having a hole therein; connecting means including a stub shaft engageable with said stator for connecting said rotor to an end of said first shaft to effect rotation of said rotor and so that said first shaft affords mechanical support to said tachometer and effects nonrotational movement of said tachometer; and restraining means to prevent rotational movement of said stator but to permit nonrotational movement of said tachometer in any direction transverse or parallel to said plate member resulting from nonrotational movement of said first shaft, said restraining means comprising a first member connected to and extending from said stator toward said plate member, said restraining means further comprising a pair of spaced apart threaded holes in said plate member, a pair of second members spaced apart from each other in a direction transverse to said axis for engagement with said first member, each of said second members having a slot therethrough, the longitudinal axis of each slot being disposed in a direction transverse to said axis, and bolts for adjustably securing said second members in desired positions, each bolt extending through the slot in its associated member and into an associated hole in said plate member.

2. A combination according to claim 1 wherein said stub shaft is integral with said first shaft.

3. A combination according to claim 1 wherein said first shaft is provided with a second hole in an end base thereof and said stub shaft is friction fitted in said second hole.

4. A combination according to claim 1 wherein said first shaft has a threaded portion at an end thereof wherein a nut is provided for attachment to said threaded portion of said shaft, and wherein said stub shaft is connected to said nut.

5. In an overhead travelling crane: a support; an electric motor having a housing and mounted on said support; a rotatable first shaft driven by said motor and having an axis; a brake for said shaft and including a base member stationarily mounted with respect to said first shaft, said base member lying in a plane generally parallel to and spaced from said axis and being in a fixed position with respect to said motor housing; said first shaft being capable of exhibiting nonrotational movement in any direction transverse to or parallel to said base member during rotation; motor control means for said motor; an electric tachometer comprising a stator and a rotor for measuring rotary motion of said first shaft and for providing an electric output signal related thereto to said rotor control means for effecting controlling of said motor, said stator having a hole therein; connecting means including a stub shaft engageable with said stator for connecting said rotor to an end of said first shaft to effect rotation of said rotor and so that said first shaft affords mechanical support to said tachometer and effects nonrotational movement of said tachometer; and restraining means to prevent rotational movement of said stator but to permit nonrotational movement of said tachometer in any direction transverse or parallel to said base member resulting from nonrotational movement of said first shaft, said restraining means comprising a first member connected to and extending from said stator toward said plate member, said restraining means further comprising a pair of spaced apart threaded holes in said plate member, a pair of second members spaced apart from each other in a direction transverse to said axis for engagement with said first member, each of said second members having a slot therethrough, the longitudinal axis of each slot being disposed in a direction transverse to said axis, and bolts for adjustably securing said second members in desired positions, each bolt extending through the slot in its associated member and into an associated hole in said base member.

6. A combination according to claim 5 wherein said stub shaft is integral with said first shaft.

7. A combination according to claim 5 wherein said first shaft is provided with a second hole in an end base thereof and said stub shaft is friction fitted in said second hole.

8. A combination according to claim 5 wherein said first shaft has a threaded portion at an end thereof wherein a nut is provided for attachment to said threaded portion of said shaft, and wherein said stub shaft is connected to said nut.

* * * * *